No. 889,202. PATENTED JUNE 2, 1908.
W. CLIFFORD & W. FERRIS.
DUMPING MECHANISM FOR DIPPER DREDGES.
APPLICATION FILED SEPT. 14, 1907.
5 SHEETS—SHEET 1.
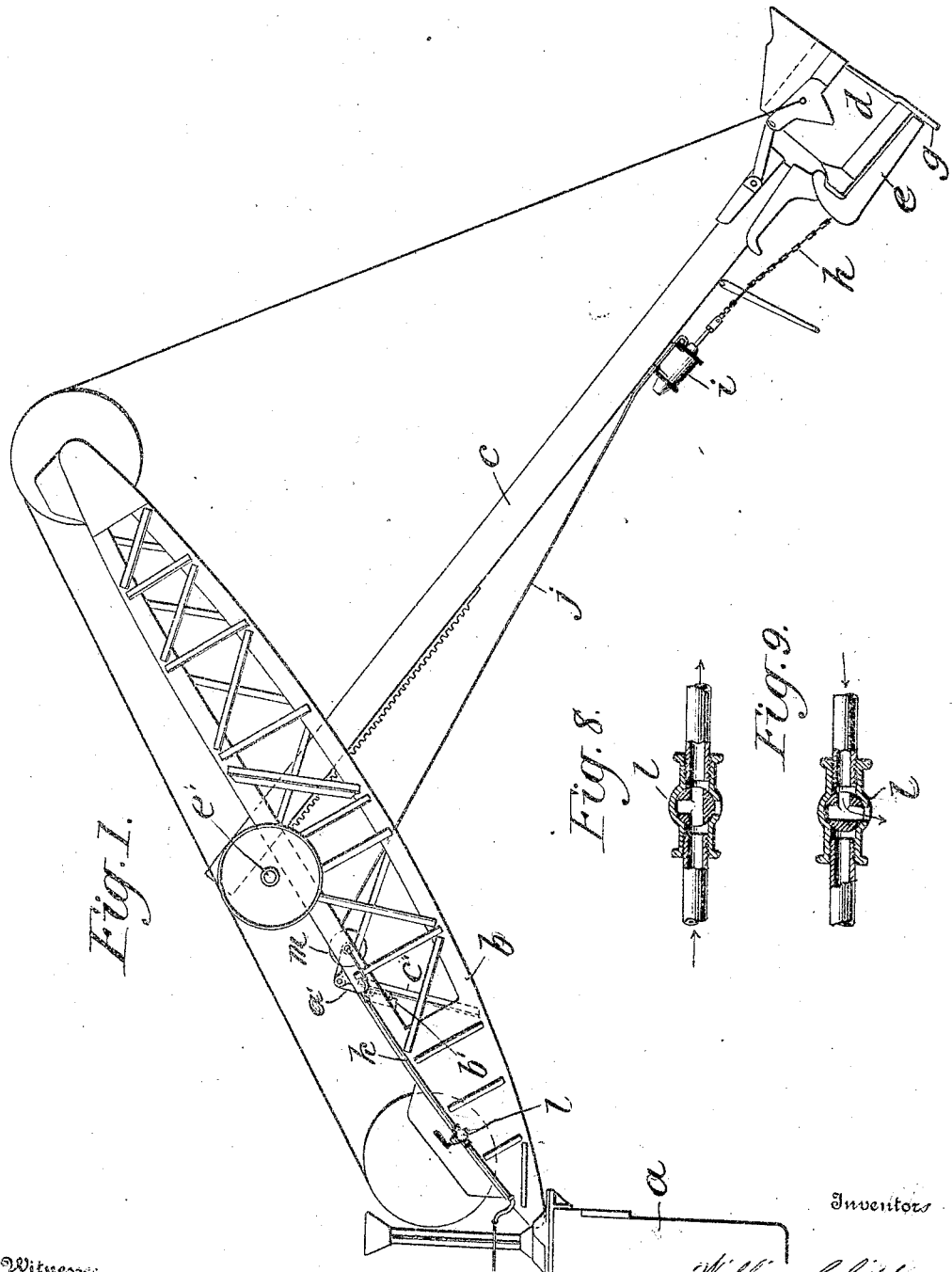

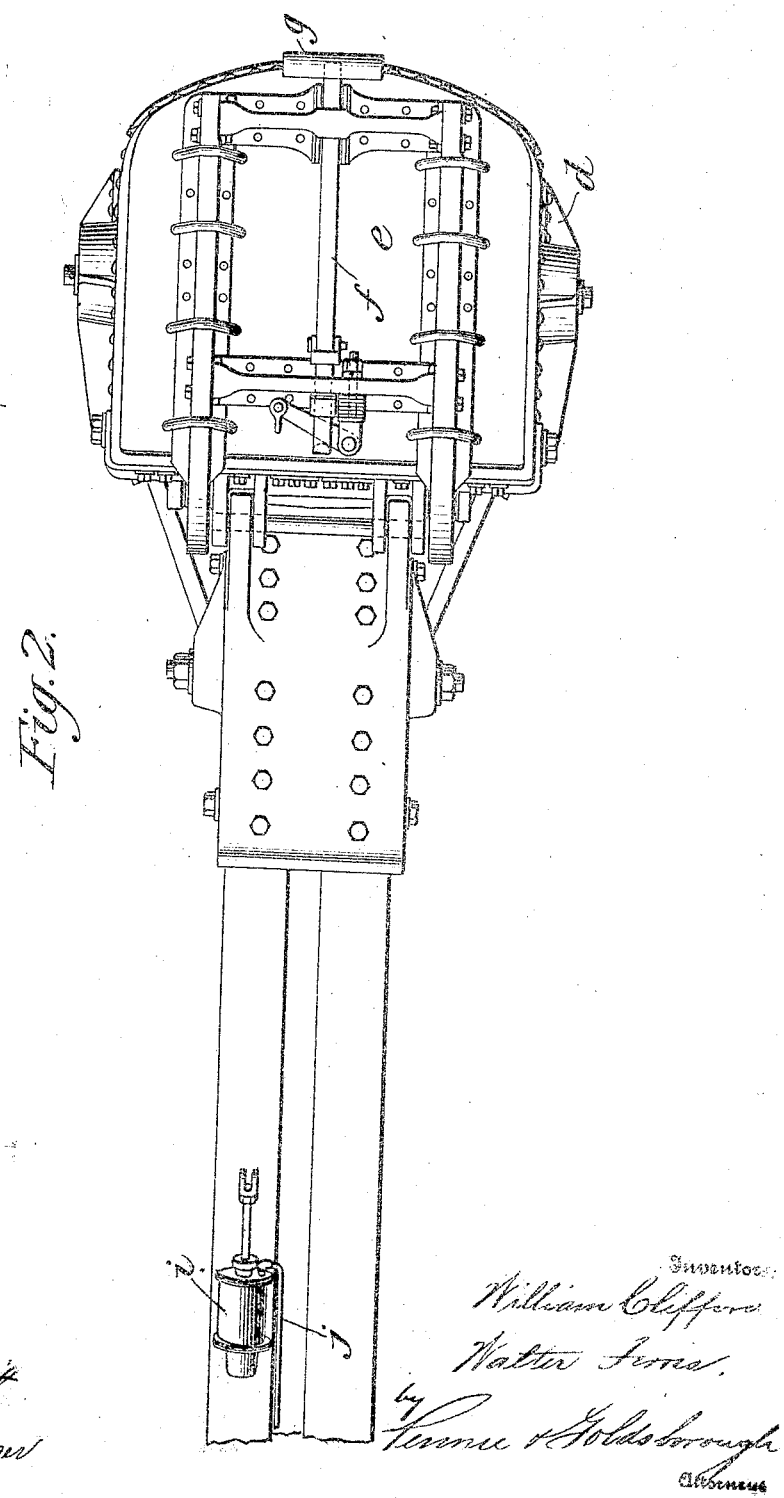

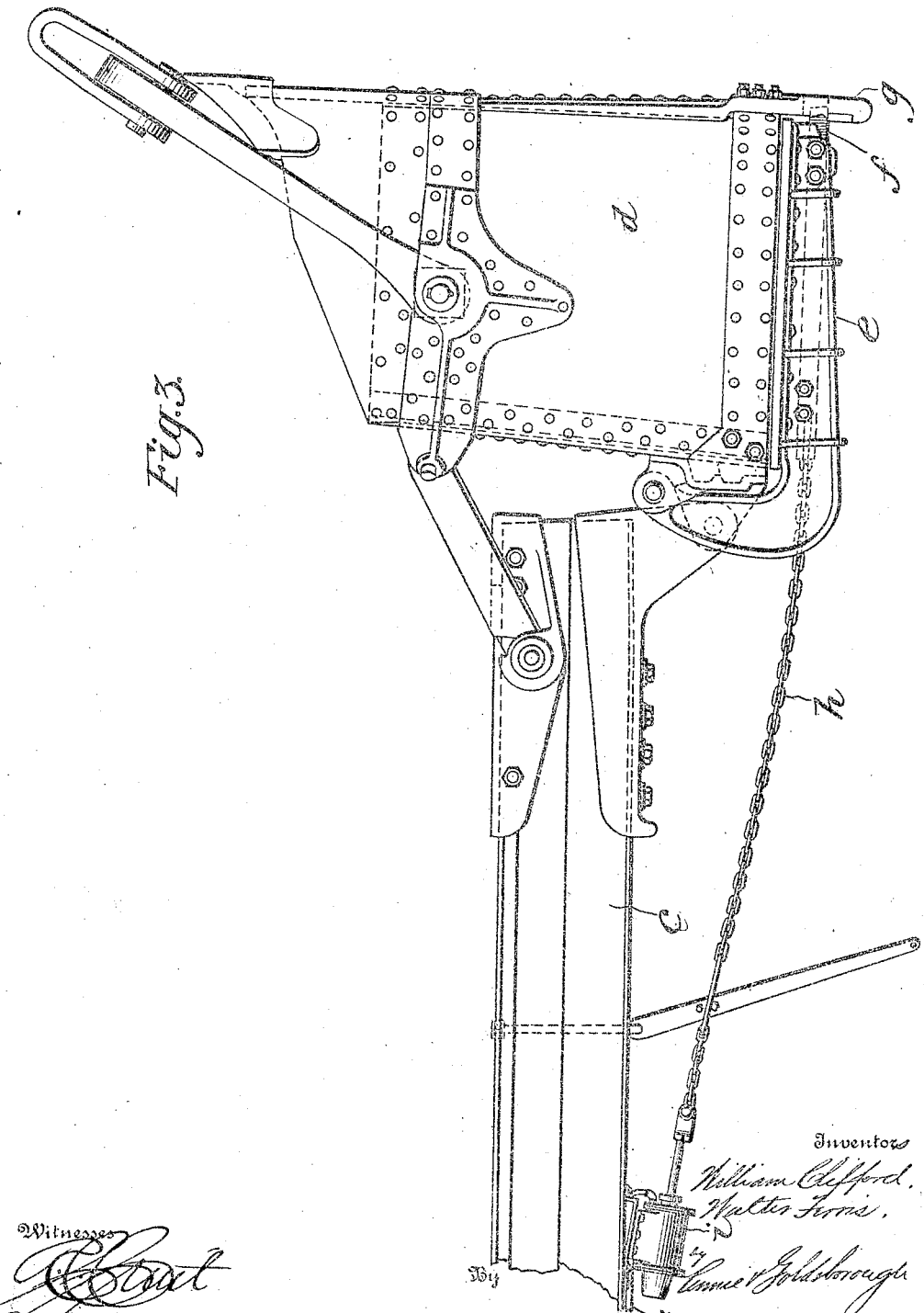

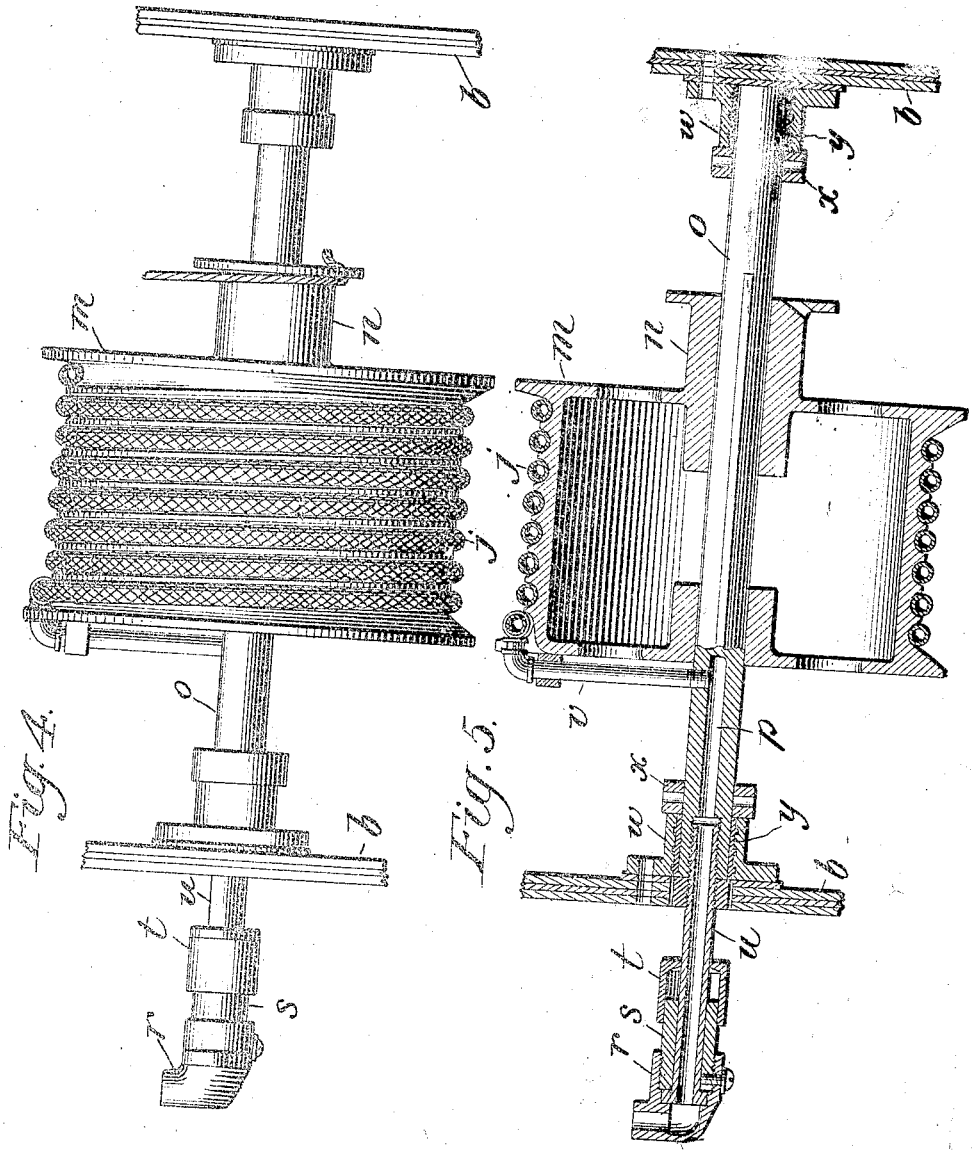

No. 889,202. PATENTED JUNE 2, 1908.
W. CLIFFORD & W. FERRIS.
DUMPING MECHANISM FOR DIPPER DREDGES.
APPLICATION FILED SEPT. 14, 1907.
5 SHEETS—SHEET 5.
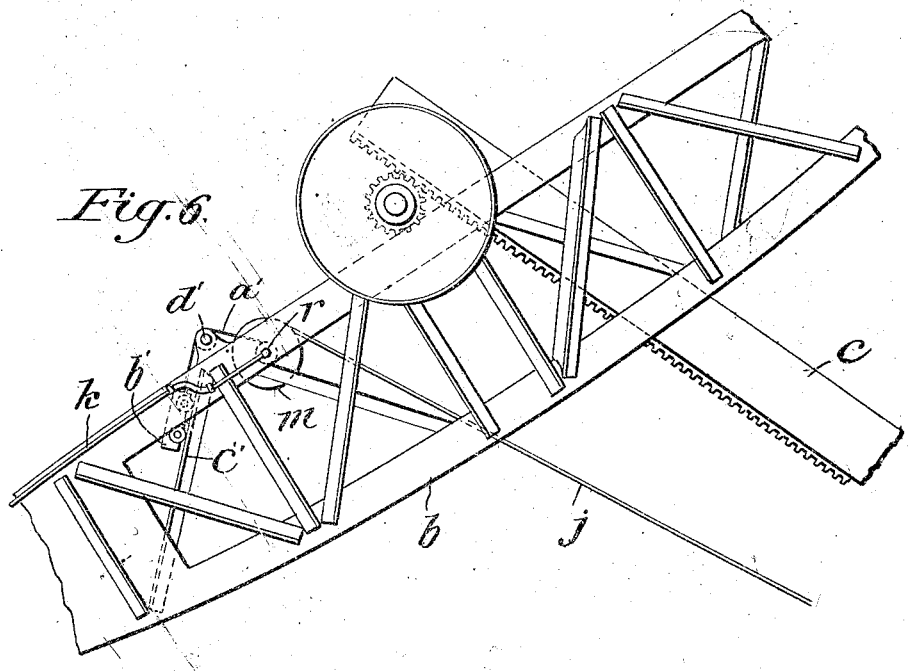
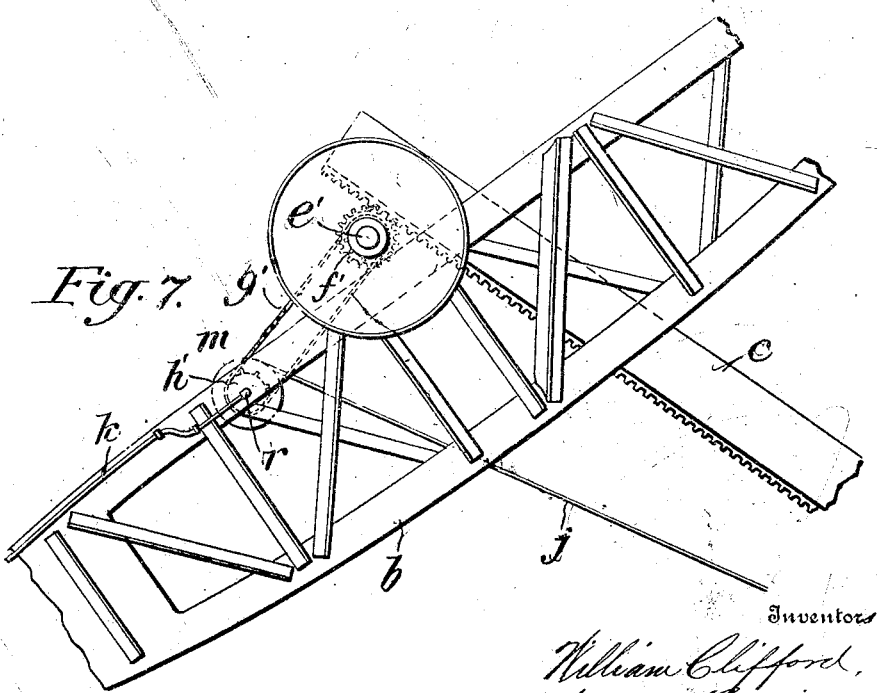

UNITED STATES PATENT OFFICE.

WILLIAM CLIFFORD, OF DULUTH, MINNESOTA, AND WALTER FERRIS, OF MILWAUKEE, WISCONSIN; SAID FERRIS ASSIGNOR TO THE BUCYRUS COMPANY, OF SOUTH MILWAUKEE, WISCONSIN, A CORPORATION OF WISCONSIN.

DUMPING MECHANISM FOR DIPPER-DREDGES.

No. 889,202.      Specification of Letters Patent.      Patented June 2, 1908.

Application filed September 14, 1907. Serial No. 392,922.

*To all whom it may concern:*

Be it known that we, WILLIAM CLIFFORD and WALTER FERRIS, both citizens of the United States, and residing in Duluth, county of St. Louis, State of Minnesota, and Milwaukee, county of Milwaukee, State of Wisconsin, respectively, have invented certain new and useful Improvements in Dumping Mechanism for Dipper-Dredges; and we do hereby declare the following to be a full, clear, and exact description of the invention, such as will enable others skilled in the art to which it appertains to make and use the same.

The invention relates to dipper dumping devices for dredges and the like, and has for its object to provide, in a dredge or the like having a fluid pressure engine for tripping the latch which holds the bottom of the dipper in closed position, means for taking up and paying out the hose which supplies the fluid pressure medium to the engine as the dipper handle moves in and out from the boom.

To this end the invention comprises a drum mounted upon the boom, upon which drum the hose is adapted to be wound, said drum being connected with a suitable source of fluid pressure through one of its trunnions, which is made hollow for this purpose, said hollow trunnion being in turn connected with the end of the hose, so that connection may be readily established with the fluid pressure engine at all times and the hose may be kept sufficiently taut between the winding drum and the fluid pressure engine to avoid kinking or buckling and also to prevent the hose from sagging when the dipper handle is moved toward the boom and thereby interfering with the operation of the mechanism.

In the accompanying drawings: Figure 1 is a side elevation of boom and dipper mechanism of a dipper dredge, employing the invention; Fig. 2 is an enlarged bottom plan view of the dipper and the forward end of its handle; Fig. 3 is a side elevation of the apparatus illustrated in Fig. 2; Fig. 4 is an enlarged front elevation of the winding drum, showing the mode of mounting the same on the boom; Fig. 5 is a longitudinal section through Fig. 4; Fig. 6 is an enlarged view of a section of the boom, showing the relation of the winding drum and its actuating means; Fig. 7 is a similar view showing a modified form of driving means for the drum; Figs. 8 and 9 are plan views partly in section of the three-way valve for controlling the admission of fluid pressure to and exhaust of the same from the fluid pressure engine.

Referring to the drawings, $a$ indicates the hull of the dredge, upon which is mounted the swinging boom $b$, which carries the dipper $d$, the latter having a handle $c$, operatively engaged with suitable gearing on the shipper shaft $e'$, as will be understood by those familiar with this type of machine. The dipper $d$ is provided with a hinged bottom $e$ which is adapted to be opened to discharge the contents of the bucket after each digging or excavating operation of the latter. The bottom $e$ is normally held in closed or locked position by means of a sliding bolt $f$, attached to the under face thereof which engages a keeper $g$ on the forward face of the bucket, as will also be understood by those skilled in the art. Connected with the bolt $f$ by means of a suitable chain, or other connecting means, $h$, is a fluid pressure engine, $i$, mounted on the lower side of the dipper handle, which said fluid pressure engine may be of any of the usual types of single acting engine. Fluid pressure is admitted to the gine $i$ by means of flexible hose or piping $j$, which connects said engine with an air compressor or other suitable source of fluid pressure, which may be conveniently located on the hull of the dredge, but which may equally well be located on the boom, if desired, and be driven by an electrical or other motor, also located on the boom.

As the dipper handle is moved in and out with respect to the boom by means of its co-operation with the actuating mechanism on the shipper shaft $e'$, during the regular operations of filling and emptying the bucket, the pipe or hose $j$ would alternately sag and tighten between its connection with the fluid pressure engine $i$, and its connection on the boom, unless some means were provided for taking up the slack as the dipper handle moves inward, and for paying out the hose as the handle is extended. As the amount of sag in the hose, when the dipper handle is at its extreme inner position, is considerable the hose would be likely to kink or buckle and also would be liable to interfere with the proper working of the dipper.

It is the purpose of this invention to provide means for taking care of the slack of the hose, so that the hose will be evenly taken in and paid out commensurately with the corresponding movements of the dipper handle. The means for effecting this result consists of a drum $m$ journaled in suitable bearings $w$, located on the side frames of the boom $b$. Said drum $m$ is provided with a grooved surface to lay up the successive coils of the hose evenly. The drum $m$ may be conveniently operated for taking up the slack of the hose, when the dipper handle moves inwardly, by means of a tail-rope $a'$ connected to a secondary drum $n$, preferably cast as a part of the main drum $m$, said tail rope being connected at its free end to a suitable counter-weight $b'$ which operates upon an inclined guide way $c'$, secured to the boom. In order that the tail rope and counter-weight may run free, said counter-weight is preferably provided with wheels which engage the guide way $c'$ and the tail rope runs over a suitable fair-lead $d'$ mounted on the top of the boom.

One end of the hose $j$ is secured to the drum by a rigid pipe connection $v$, which communicates with a conduit $p$ formed in one of the trunnions of said drum $m$. Said hollow trunnion is provided with a nipple or pipe section $u$, screw threaded in the end thereof, which is rotatably connected with the fluid pressure supply pipe $k$, leading to the compressor or other suitable source of pressure, by means of an elbow joint $r$, so as to permit the drum $m$ and connecting nipple $u$ to rotate freely in either direction and also maintain free communication between the fluid pressure engine $i$ and the source of fluid pressure through the hose $j$, pipe $v$, hollow trunnion $p$, nipple $u$, and pipe $k$.

In order to control the supply of fluid pressure to the engine $i$ and to regulate the exhaust of the latter, there is interposed in the pipe $k$ a three-way valve $l$, which is adapted to open up communication directly between the source of pressure and the engine $i$, to close such connection and establish a direct discharge of the pressure from the engine to the atmosphere, or to shut off both the supply and exhaust. This three-way valve $l$ may be located either on the boom $b$, or on the hull of the dredge adjacent to the station of the engineer, who controls the other mechanism, but, in any event, is accessible for ready control in any position.

The operation of the apparatus, as hereinbefore described, is substantially as follows. When the bucket $d$ is dropped for a digging or excavating operation, the bottom $e$ thereof closes by gravity, and is held in closed position by means of the latch bar $f$ engaging the keeper $g$. After the loaded bucket has been lifted through the coöperation of its handle $c$ and the shipper shaft $e'$, and it is desired to dump the bucket, three-way valve $l$ is turned to admit pressure from the compressor or other source of fluid, to the engine $i$ by way of pipe $k$, nipple $u$, hollow trunnion $p$, pipe $v$, and hose $j$, which causes the piston in the cylinder to be retracted, thereby withdrawing latch $f$ by reason of the connection of the latter with the piston rod through chain $h$. As the dipper handle $c$ moves in toward the boom, during either the digging or dumping operation, the slack in the hose $j$, occasioned by this movement of the dipper handle, will be instantly taken up by the drum which is rotated by the counter-weight $d'$ and the tail rope $a'$, pulling upon the auxiliary drum $n$. For the reverse motion of the dipper handle, tension is put upon the pipe $j$ which causes the latter to be drawn off the drum $m$, rotating the latter and causing the tail rope $a'$ to be wound upon the auxiliary drum $n$. It will therefore be noted that for each movement of the dipper handle either toward or from the boom, the pipe $j$ will be kept under substantially uniform tension and all undue sagging thereof will be prevented. As soon as the bucket has been dumped, the three-way valve $l$ is moved to the position shown in Fig. 9, thereby cutting off connection with the source of power and opening up the engine $i$ to the exhaust. As the bucket swings downward for another digging operation, the bottom thereof swings shut by gravity, and the latch $f$ falls into place, and the piston in engine $i$ is returned to its forward position, for the next operation.

Instead of employing a counter-weight and tail rope, associated with an auxiliary power drum, for operating the pipe drum $m$, the latter may be positively operated from the shipper shaft, and a convenient means for effecting this result is by connecting the drum to the shipper shaft with a chain $g'$, engaging a sprocket $f'$ on the shipper shaft and a similar sprocket on the shaft of said drum. With this arrangement of drive for the drum $m$, it will be noted that the latter is positively operated to take up the slack of the pipe $j$, without imposing any undue strain or tension on the pipe, inasmuch as the said pipe is taken up and paid out to an extent substantially commensurate with the corresponding movements of the dipper handle.

What we claim is:—

1. In a dipper dredge or the like, the combination of fluid pressure means for tripping the locking means for the dipper bottom, flexible piping for connecting the fluid pressure means with a source of supply, and means on the boom for taking up the slack in said piping as the dipper handle moves inward.

2. In a dipper dredge or the like, the combination of a fluid pressure engine on the dipper handle operatively connected with the latch bolt on the dipper bottom, a drum located on the boom, flexible piping for supplying pressure to said engine, and means for rotating the drum to take up the slack of said piping as the dipper handle moves inward.

3. In a dipper dredge or the like, the combination of a fluid pressure engine on the dipper handle operatively connected with the latch bolt on the dipper bottom, a drum located on the boom, flexible piping for supplying pressure to said engine, means for connecting said piping with the hollow trunnion of said drum connections between said trunnion and a source of fluid supply, and means for actuating the drum to take up the slack of the piping.

4. In a dipper dredge or the like, the combination of a fluid pressure engine on the boom operatively connected with the latch bolt of the dipper bottom, a drum on the boom, flexible piping attached at one end to said drum and at the other to said engine, means for connecting the drum end of said piping with a source of fluid pressure, and means for actuating the drum to take up the slack of the piping.

5. In a dipper dredge or the like, the combination of a fluid pressure engine on the boom operatively connected with the latch bolt of the dipper bottom, a drum on the boom, flexible piping attached at one end to said drum and at the other to said engine, means for connecting the drum end of said piping with a source of fluid pressure, and a tail rope and counter-weight operatively connected with said drum to drive the same in a direction to take up the slack of the piping.

6. In a dipper dredge or the like, the combination of a fluid pressure engine on the boom operatively connected with the latch bolt of the dipper bottom, a drum on the boom, having a hollow trunnion connected with a source of fluid pressure, flexible piping connected at one end with said hollow trunnion and at the other to said engine, and means for actuating the drum to take up the slack of the piping.

7. In a dipper dredge or the like, the combination of a fluid pressure engine on the boom operatively connected with the latch bolt of the dipper bottom, a drum on the boom, having a hollow trunnion connected with a source of fluid pressure, flexible piping connected at one end with said hollow trunnion and at the other to said engine, and a tail rope and counter-weight operatively connected with said drum to drive the same in a direction to take up the slack of the piping.

In testimony whereof we affix our signatures, in presence of two witnesses.

WILLIAM CLIFFORD.
WALTER FERRIS.

Witnesses for Clifford:
NAPOLEON CRIGNON,
REMONT B. KIOD.

Witnesses for Ferris:
HARRY B. HAYDEN,
W. H. ROUSE.